US009375845B1

(12) United States Patent
Annan et al.

(10) Patent No.: US 9,375,845 B1
(45) Date of Patent: Jun. 28, 2016

(54) SYNCHRONIZING ROBOT MOTION WITH SOCIAL INTERACTION

(71) Applicant: Sprint Communications Company L.P., Overland Park, KS (US)

(72) Inventors: Brandon C. Annan, Westwood Hills, KS (US); Joshua R. Cole, Overland Park, KS (US); Deborah L. Gilbert, Kansas City, MO (US); Dhananjay Indurkar, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 14/503,385

(22) Filed: Sep. 30, 2014

(51) Int. Cl.
 *G06F 19/00* (2011.01)
 *B25J 11/00* (2006.01)
(52) U.S. Cl.
 CPC .................................. *B25J 11/0005* (2013.01)
(58) Field of Classification Search
 CPC ...................................................... B25J 11/0005
 See application file for complete search history.

(56) References Cited

U.S. PATENT DOCUMENTS

| 8,463,720 B1* | 6/2013 | Seale ..................... G06N 3/061 704/200 |
| 9,213,931 B1 | 12/2015 | Annan et al. |
| 2007/0156625 A1* | 7/2007 | Visel ........................ G06N 3/02 706/62 |
| 2007/0282765 A1* | 12/2007 | Visel ........................ G06N 3/02 706/14 |
| 2011/0158470 A1 | 6/2011 | Martin et al. |
| 2013/0015236 A1 | 1/2013 | Porter et al. |
| 2013/0126619 A1 | 5/2013 | Del Fiume et al. |

OTHER PUBLICATIONS

Notice of Allowance dated Jul. 30, 2015, U.S. Appl. No. 14/607,792, filed Jan. 28, 2015.
Annan, Brandon C., et al., Patent Application entitled, "Interactive Behavior Engagement and Management in Subordinate Airborne Robots ," filed Jan. 8, 2015, U.S. Appl. No. 14/592,677.
Annan, Brandon C., et al., Patent Application entitled, "Sensor Use and Analysis for Dynamic Update of Interaction in a Social Robot," filed Jul. 8, 2015, U.S. Appl. No. 14/794,765.
Annan, Brandon C., et al., Patent Application entitled, "Dynamic Interactive Robot Dialogue Creation Incorporating Disparate Information Sources and Collective Feedback Analysis," filed Mar. 3, 2016, U.S. Appl. No. 15/060,565.

* cited by examiner

*Primary Examiner* — Ian Jen

(57) ABSTRACT

A method of synchronizing robot motion with a social interaction. The method comprises storing in the robot a map that associates keywords with at least one robot motion, composing by the robot a dialogue based on a context of a social interaction with a human being, searching the dialogue for keywords, parsing the dialogue to determine its syntax, and analyzing the syntax. The method further comprises generating, by the robot, a robot motion script synchronized with the dialogue based on mapping one or more keywords located in the dialogue to robot motions, based on the syntax of the dialogue, and based on a physical cadence, wherein the robot motion script comprises a sequence of separate robot motions. The method further comprises playing aloud the dialogue by the robot and performing the robot motion script by the robot in synchronization with the playing aloud of the dialogue.

20 Claims, 6 Drawing Sheets

SYNCHRONIZING ROBOT MOTION WITH SOCIAL INTERACTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Robots are electromechanical devices that are controlled by logic executed by the robot. Robots may be autonomous or semi-autonomous. Robots have come to have widespread use in heavy industry, for example in manufacturing automobiles. New applications for robots are emerging that involve robots interacting directly with human beings. Social robots may be used to augment teaching and may have particular efficacy in working with autistic children. Social robots may have a role in providing companionship to elderly persons who live alone.

SUMMARY

In an embodiment, a method of synchronizing robot motion with a social interaction is disclosed. The method comprises storing a map that associates each of a plurality of pre-defined keywords with at least one robot motion, inputting a robot dialogue comprising words to a computer, and searching the robot dialogue by the computer to locate pre-defined keywords. The method further comprises parsing the robot dialogue by the computer to determine a syntax of the robot dialogue and analyzing the syntax of the dialogue by the computer. The method further comprises automatically generating, by the computer, a robot motion script synchronized with the robot dialogue based on mapping one or more pre-defined keywords located in the robot dialogue to robot motions, based on the syntax of the robot dialogue, and based on a physical cadence, wherein the robot motion script comprises a sequence of separate robot motions. The method further comprises executing the robot motion script by a social robot.

In an embodiment, another method of synchronizing robot motion with a social interaction is disclosed. The method comprises storing a map in an electronic memory of a robot, wherein the map associates each of a plurality of pre-defined keywords with at least one robot motion and composing by the robot a robot dialogue comprising words, wherein the robot dialogue is composed based on a context of an on-going social interaction with a human being. The method further comprises searching the robot dialogue by the robot to locate pre-defined keywords, parsing the robot dialogue by the robot to determine a syntax of the robot dialogue, and analyzing the syntax of the dialogue by the robot. The method further comprises automatically generating, by the robot, a robot motion script synchronized with the robot dialogue based on mapping one or more pre-defined keywords located in the robot dialogue to robot motions, based on the syntax of the dialogue, and based on a physical cadence, wherein the robot motion script comprises a sequence of separate robot motions. The method further comprises playing aloud the robot dialogue by the robot and performing the robot motion script by the robot in synchronization with the playing aloud of the robot dialogue.

In an embodiment, yet another method of synchronizing robot motion with a social interaction is disclosed. The method comprises composing by the robot a robot dialogue comprising words, wherein the robot dialogue is composed based on a context of an on-going social interaction with a human being, parsing the robot dialogue by the robot to determine a syntax of the robot dialogue, and analyzing the syntax of the dialogue by the robot. The method further comprises analyzing a communication of a human being by the robot and automatically generating, by the robot, a robot motion script synchronized with the robot dialogue based on the syntax of the dialogue, based on analyzing the communication of the human being, and based on a physical cadence, wherein the robot motion script comprises a sequence of separate robot motions. The method further comprises playing aloud the robot dialogue by the robot and performing the robot motion script by the robot in synchronization with the playing aloud of the robot dialogue.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
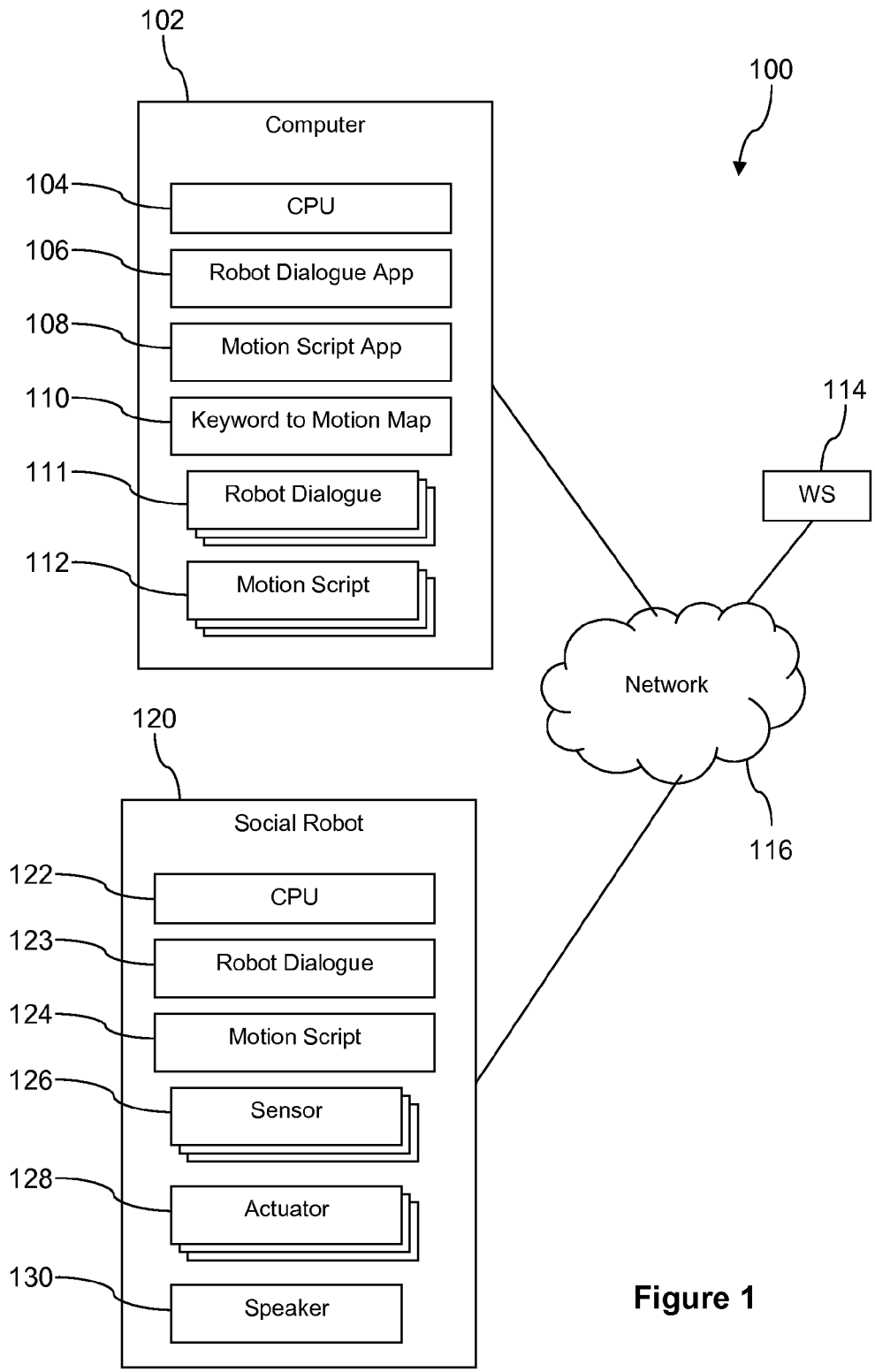
FIG. 1 is a block diagram of a robot motion script development system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches synchronizing robot motion with a social interaction between a social robot and one or more human beings. Interactions between social robots and human beings can be more effective and satisfying if the robot is able to adapt its motion to the context of the social interaction. Body language, gestures, and random motion are familiar constituents of human-to-human communication. Incorporating context sensitive motion into the social robot motion can build increased rapport and closeness between a human being and the social robot. It is contemplated that social robots may have applications as companions to elderly people as well as others.

In an embodiment, a robot dialogue is developed, and an application on a computer generates a robot motion script that can be synchronized with the robot dialogue. The robot dialogue and the robot motion script are downloaded to the social robot. When the social robot recites the dialogue, the robot enacts the robot motion script synchronized with the recitation of the dialogue. In another embodiment, the social robot generates the robot dialogue and robot motion script autonomously, recites the robot dialogue, and enacts the robot motion script synchronized with the recitation of the dialogue. It is also contemplated that these embodiments may be combined (e.g., the social robot plays back robot dialogues and robot motion scripts generated on the computer AND plays back robot dialogues and robot motion scripts generated autonomously by the social robot).

The present disclosure teaches several strategies for generating a robot motion script based on a robot dialogue. A robot dialogue comprises words and may further define intonations, pauses, and rhythms for speaking those words. While these strategies are described one-by-one and separately below, it is understood that two or more of the strategies can be used together to generate a robot motion script for one robot dialogue. A map of keywords to robot gestures or motions can be used to generate some part of the robot motion script. A keyword, for example 'you,' may be mapped to a plurality of robot gestures. For example, 'you' may be associated with (1) the social robot pointing an index finger with thumb and other fingers folded over the palm at the person to whom the social robot is speaking, with (2) the social robot holding the palm of the hand open and up, with fingers pointing towards the addressed person, with (3) a nod of the head towards the addressed person, and other gestures. One of many gestures associated with a keyword may be selected based on the social context or based on a history of previous gestures. For example, if the last two times the robot has said 'you,' it employed the index finger pointing gesture, just to provide variety, the robot may instead synchronize 'you' with a head nod. If the social context is the robot and the human being relocating from one room to another room, the robot may synchronize 'you' with the hand open, palm up gesture.

The robot dialogue can be parsed to determine the syntax of the dialogue, and the syntax can be analyzed to select an appropriate gesture. For example, if the dialogue is a question addressed to the person ("Do you think it will rain today, Mr Gordon?"), the robot motion script may include canting the robot's head to one side. If the dialogue is a statement about a disagreeable fact ("Our favorite team lost again yesterday, Mr Gordon. That is the fourth game in a row we have lost!"), the robot motion script may include turning the robot's head from side to side. In an embodiment, the robot may also parse the human dialogue directed to it and analyze the syntax of the human dialogue to select an appropriate gesture in response to being spoken to by the person. For example, the robot motion script may include occasional head nods to indicate listening. The robot motion script may include folding one arm across the robot's chest, supporting the elbow of the other arm in the hand of the folded arm, and propping the robot's chin in the hand of the other arm that is extended upright, as if the robot were carefully thinking about what the person was saying. If the human statement is a complaint, the robot motion script may include a roll of the robot eyes combined with a head nod.

The robot motion script may incorporate motions that mimic meaning-neutral human motion such as blinking the eyes occasionally, shifting weight from one side to another. It is understood that an eye blink may be conveyed by a video representation of an eye blinking presented on a graphical display or by a physical representation of an eye. These meaning-neutral motions may be referred to as random motions or unconscious motions. These meaning-neutral motions may be said to exhibit a cadence or rhythm that can be adapted to the social interaction. If the person talking to the robot is frustrated or is talking loudly, the frequency of these motions may increase and the amplitude of the motion—the distance of motion, the angle displacement—may increase. If the person talking to the robot is talking quietly, the cadence and amplitude may decrease. The cadence can be established by varying a frequency of a motion or a period of motion within a range. For example, the robot in a first cadence may blink its eyes between once every 3 seconds and once every 10 seconds. The robot in a second cadence may blink its eyes between once every 5 seconds and once every 20 seconds. The frequency of the meaning-neutral motion may vary randomly within the pre-defined frequency range. Hereinafter meaning-neutral motions are discussed with reference to frequency. It is understood, however, that the meaning-neutral motions may equally be discussed with reference to periods of the subject motions. It is well-known that a period is the inverse of an associated frequency. Thus, a frequency of 6 eye blinks per minute (6/minute) is associated with a period of 10 seconds or ⅙ minute.

The robot may observe the person it is engaging with and adapt its motion to those observations. For example, a camera embedded in the social robot may take pictures or video of the person, analyze the pictures or video, and identify a specific gesture or motion of the person. The robot may mirror the body language of the person. For example, if the person folds his or her arms across the chest, the robot may fold its arms across its chest. If the person holds out their palm in a halt gesture and turns his or her head, the robot may stop speaking and back-up slightly. If the person approaches the robot more closely, the robot may speak more softly and may restrict the amplitude or displacement of its gestures. In some contexts, this may be referred to as implicit feedback. If the person tells the robot to calm down, to quiet down, to speak louder, the robot can adapt to this explicit feedback.

Turning now to FIG. 1, a robot motion script development system 100 is described. In an embodiment, the system 100 comprises a computer 102 that comprises a central processing unit (CPU) 104 or processor, a robot dialogue application 106, a robot motion script application 108. A work station 114 may be used to input text (e.g., words to be spoken by the robot) via a network 116 to the computer 102. The work station 114 may also be used to input indications of intonations, pauses, and rhythms for pronouncing the words. Based on the text (and possibly based on indications of intonations, pauses, and rhythms), the robot dialogue application 106 executing on the computer 102 may develop or generate a robot dialogue 111. Based on the robot dialogue 111, the motion script application 108 executing on the computer 102 may generate a robot motion script 112 to be synchronized with the robot dialogue 111 when it is spoken by a social robot 120. The computer 102 may download the robot dialogue 111 and the robot motion script 112 to the social robot 120 via the network 116. The details of computers such as computer 102 are described further hereinafter. The network 116 may be one or more private networks, one or more public networks, or a combination thereof.

The robot dialogue application 106 receives inputs from the work station 114 and creates robot dialogues that are suitable for use by the social robot 120. The robot dialogues 111 may comprise information in addition to text. For example the robot dialogues 111 may comprise intonation cues or instructions. The robot dialogues 111 may comprise pause cues and/or rhythm cues. The robot dialogues 111 may comprise a list of contextual triggers that may be used by the social robot 120 to determine when to playback or "speak" a robot dialogue 111 to a person.

The robot motion script application 108 may develop robot motion scripts 112 based on the robot dialogues 111. The robot motion script dialogue 108, when executed by the processor 104, may search one of the robot dialogues 111 to find one or more keywords that are identified in the keyword to motion map 110. When a match between a word in the robot dialogue 111 and a keyword in the keyword motion map 110 is found, the robot motion script application 108 reads one or more robot motions or robot gestures that are associated with the subject keyword. The robot motion script application 108 may choose one robot gesture or motion to play back when the subject keyword is spoken by the social robot 120, for example when the social robot 120 plays back the subject keyword on speakers that form part of the social robot 120.

The keyword to motion map 110 may be configured in advance and later may be updated occasionally or periodically. Each keyword in the map 110 may associate to or map to one or more robot motions or robot gestures. Likewise, a single robot motion or robot gesture may be associated with one or more different keywords. In an embodiment, a mapping of a keyword to robot motions or robot gestures may provide an indication of weighting or preference for the association between the keyword and a motion or gesture. Thus, a keyword may associate to three different motions, but the three motions may not be equally preferred. The first motion may have a 0.5 preference; the second motion may have a 0.3 preference; and the third motion may have a 0.2 preference. The selection of a motion or gesture to synchronize with the speaking of the keyword may be based at least in part on the preference weightings. The preference weightings may be used to choose how often and to which alternative keyword to motion mapping to use to provide some natural variation and interest in robot motions and gestures. It is understood that the weighting of the keyword-motion mapping or association is linked to that specific pair. The weighting of the same motion associated to a different keyword may be independent.

A robot motion or robot gesture may be composed of a plurality of robot motion actuations. For example, a single robot motion may comprise raising the upper arm, bending the lower arm at the elbow, rotating the wrist, extending the fingers, and waving the wrist back and forth. A robot motion or robot gesture may be comprised of any number of discrete or single actuator motions, performed concurrently and/or in sequence. The robot motions or robot gestures may be encoded to succinctly define or identify the actuations of the social robot 120 that enact the subject motion and/or gesture. The encoding may comprise computer programs or methods. The encoding may comprise identifications of computer programs or methods. The robot motions and/or robot gestures may be selected from a pre-defined list of robot motions and/or robot gestures that the social robot 120 is programmed to enact, for example to enact based on executing computer programs or computer methods.

The robot motion script application 108 may select the robot gesture from a plurality of robot gestures mapped to the subject keyword based in part on a context of the robot motion script 112. For example, the context may be humorous, serious, grieving, celebratory, encouraging, informative, or other contexts. In an embodiment, a list of contexts may be enumerated, and each gesture in the keyword motion map 110 may be associated with one or more of these enumerated contexts.

The robot dialogues 111 may be downloaded via the network 116 to the social robot 120 and may be installed or loaded in a memory of the social robot 120 as one or more robot dialogue 123. The robot motion scripts 112 may be downloaded via the network 116 to the social robot 120 and may be installed or loaded in the memory of the social robot 120 as one or more robot motion scripts 124. The social robot 120 comprises a processor 122, one or more sensors 126, one or more actuators 128, and one or more speakers 130. The sensors 126 may comprise microphones, cameras, temperature sensors, sonar sensors, and others. The sensors 126 provide input to the social robot 120 from the external world or the social milieu. The actuators 128 may include pneumatic pistons, electric motors, and the like. The actuators 128 may comprise gears and drive mechanisms to initiate motion under force provided by pneumatic pistons, electric motors, or others.

In an example, the social robot 120 is a companion to an elderly man living on his own. The man may speak to the social robot 120, and robot 120 may "hear" the voice of the man using a microphone that is one of the sensors 126. The processor 122 may execute an application that analyzes the voice signal received by the microphone (e.g., a voice recognition component or application may be executed by the processor 122), performs voice recognition processing on the voice signal, and may select one of the robot dialogues 123 to play back through the speaker 130. At the same time that the robot dialog 123 is played back through the speaker 130, one of the motion scripts 124 may be enacted by the social robot 120 by controlling one or more of the actuators 128 to move. This process may be referred to in some contexts as synchronizing robot motion with robot dialogue. The synchronization of robot motion to robot dialogue may be supported by synchronizing events or markers embedded in the robot motion scripts 112, 124 and the robot dialogues 111, 123. Alternatively or in addition, the synchronization or robot motion to robot dialogue may be supported by a timing associated with each of the robot motion scripts 112, 124 and the robot dialogues 111, 123. Thus, a motion 3 seconds into playback of the robot motion script 124 is synchronized with a word spoken 3 seconds into playback of the robot dialogue 123. It is contemplated, however, that the social robot 120 may be used in other situations that don't involve providing companionship to elderly people.

The robot motion script development system 100 may be used to develop dialogue and motion scripts to perform relatively predictable social interchanges. For example, the system 100 may create a stretching exercise scenario where the social robot 120 encourages the elderly man to rotate his shoulders with reference to his hips, to extend and retract his fingers, to rotate his wrist while keeping his elbow stationary. A robot dialogue 111 exhorting the man to perform the exercise and counting time may be developed and a robot motion script 112 to demonstrate, to enact, or to lead the exercise may likewise be developed.

This scenario might be envisioned to have a short list of different paths it might follow. In one path, the elderly man does the exercises. An encouraging robot dialogue 111 and associated robot motion script 112 can be developed for that path. In a second path, the elderly man does not perform the exercise. The man may not hear the request from the social robot 120 to begin the exercise and follow with the robot 120 who is itself enacting the subject exercise. A robot dialogue 111 for this path may involve speaking the same words at a louder volume and/or with a different intonation. The robot motion script 112 may involve waving the hands of the social robot 120 to first get the attention of the man, then waving the man up to his feet, and then again enacting the exercise. In a third path, the man may say he is not feeling well and does not want to perform the exercise at that time. A robot dialogue 111 that commiserates with the man for his discomfort and gently inquires if he has taken his medication may be developed for this path to be associated with a robot motion script 112 that enacts a caring, sympathetic demeanor.

The robot dialogue 123 and the robot motion script 124 may be triggered for play back by a request voiced by a human being, by the expiration of a timer or the occurrence of a scheduled event, or by identification of a trigger defined in terms of a social context or social interaction. The robot dialogue 123 and the robot motion script 124 may be played back any number of times.

Figure 2:
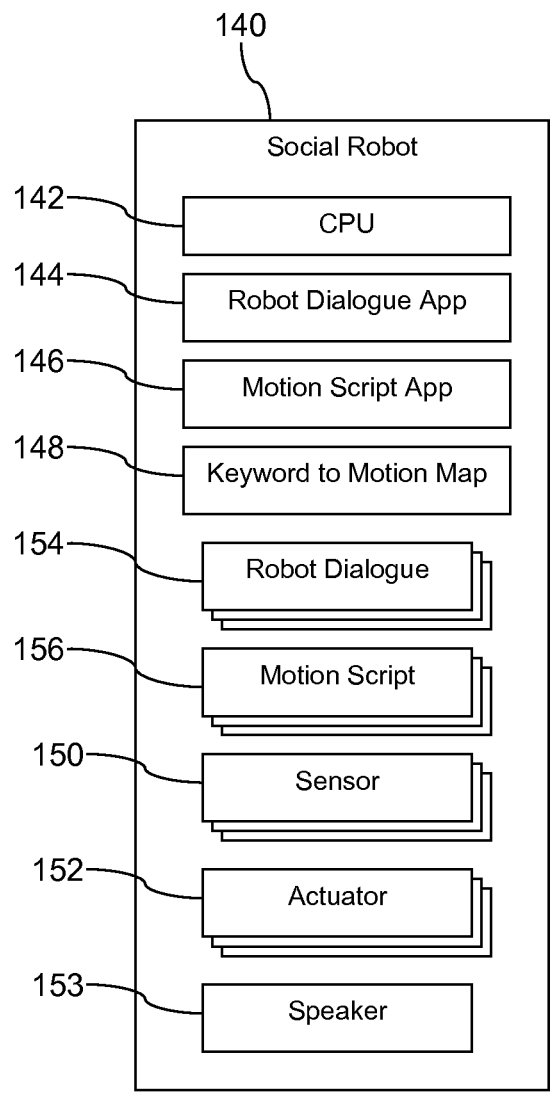
FIG. 2 is a block diagram of a robot according to an embodiment of the disclosure.

Turning now to FIG. 2, a second social robot 140 is described. Some of the features of the second social robot 140 may be similar to those of the social robot 120. Additionally, some of the use scenarios described above may be applicable to the second social robot 140. For example, some of the robot dialogues 111 and the motion scripts 112 developed with the robot motion script development system 100 described above may be downloaded via the network 116 to the second social robot 140.

The second social robot 140, however, further comprises capabilities that were not attributed to the social robot 120 described with reference to FIG. 1. The second social robot 140 has the capability of dynamically generating both robot dialogues and associated robot motion scripts as the need arises in social interchanges. While the robot dialogues and associated robot motion scripts may be dynamically generated in response to a new social interchange, these robot dialogues and associated robot motion scripts may be stored in a memory of the social robot 140 and reused when triggered by a social interchange, when triggered by an event, or when scheduled.

In an embodiment, the second social robot 140 comprises a processor 142, a robot dialogue application 144, a motion script application 146, a keyword to motion map 148, a plurality of robot dialogues 154, a plurality of motion scripts 156, a plurality of sensors 150, a plurality of actuators 152, and one or more speakers 153. The keyword to motion map 148, the sensors 150, the actuators 152, and the speakers 153 may be substantially similar to the like features of the social robot 120 described above with reference to FIG. 1.

The second social robot 140 may retain a historical context or build a social interaction context over time and adapt both the robot dialogues 154 and the robot motion scripts 156 based on the accumulated social interaction context. For example, the second social robot 140 may learn, from earlier social interactions with the example elderly man, that the man does not like some robot motions and/or robot gestures and is pleased with other robot motions and/or robot gestures. The second social robot 140 may accordingly avoid enacting the former and increase its frequency of enacting the later. The accumulated social interaction context or history may be used in other ways also.

The robot dialogue application 144 may create robot dialogues 154 on the fly in response to a current social interaction. The robot motion script application 146 may analyze the robot dialogues 154, as described above, and generate robot motion scripts 156 that may be enacted in synchronization with play back of the robot dialogues 154. The robot motion script application 146 may further include motion enactments in the robot motion scripts 156 that are not directly related to the robot dialogues 154 but are directed to emulating natural human motion such as occasional blinking of eyes, shifting weight from one side to another, and the like. The robot motion script application 146 may further include motion enactments (meaning-neutral motions) in the robot motion scripts 156 that are synchronized with dialogue spoken by a person and sensed by the sensors 150, for example a microphone. Such motion enactments may comprise nodding the head of the second social robot 140 to show continued interest or at least attention, raising eyebrows in response to a bold statement by the person, and the like. Some of these motions and/or gestures that are not specifically coordinated with the robot dialogues 154 spoken (e.g., played back over the speaker 153) by the second social robot 140 may be referred to as "cadence" motion and may be repeated with a frequency that randomly varies within a range of frequency. As used herein, random variation can be determined by using a random number generator or some other randomizing algorithm.

The range of frequency of an eye blinking may vary randomly between about 5 blinks per minute to about 25 blinks per minute, between about 8 blinks per minute to about 20 blinks per minute, between about 10 blinks per minute to about 15 blinks per minute. In some cases, the cadence of eye blinking may vary based on the social context. For example, if the social context is sadness or grieving, the cadence of eye blinking may vary between frequencies that are relatively higher than for other social contexts. The amplitude of head nods (an angular arc of head displacement) and/or the speed of performing head nods may vary randomly within a pre-defined range of head nods. The amplitude and/or speed of head nods may increase based on social context. The weight shift frequency may vary randomly within a pre-defined weight shift frequency range. To support varying cadence motions, the robot motion script application 146 or another application executing on the processor 142 may keep a log of eye blink robot motions, weight shift robot motions, and head nod robot motions performed by the robot.

The robot motion script application 146 may parse the robot dialogue 154 to determine the syntax of the robot dialogue 154. The motion script application 146 may occasionally include a head cant robot motion or robot gesture in response to determining that the syntax of at least a portion of the robot dialogue 154 is a question. The motion script application 146 may occasionally include a raised eyebrow motion (e.g., lifting of a video representation of an eyebrow on a display screen or lifting of a physical representation of an eyebrow) or another gesture in response to determine that the syntax of a part of the robot dialogue 154 is an exclamation.

The person may tell the social robot 140 to alter behavior. For example, the person may tell the social robot 140 to swing its arms less, because this makes the person nervous. The robot motion script application 146 may adapt its generation of the robot motion scripts 156 accordingly. This may be referred to as generating the robot motion script 156, at least in part, based on explicit feedback from a person. It is said to be explicit feedback because the person is explicitly telling the social robot 140 how to adapt the robot motion. The person may tell the social robot 140 to speak louder, to speak more quietly, to move more slowly, or to move less. The robot motion script application 146 may adapt its generation of the robot motion scripts 156 accordingly.

In an embodiment, the robot motion script application 146 may parse the dialogue spoken by a person and may generate the robot motion script 156 further based on the analysis of the dialogue spoken by the person. The robot motion script application 146 may analyze the body language or gestures of a person and may generate the robot motion script 156 further based on the analysis of the body language or gestures of the person. This may be referred to as generating the robot motion script 156, at least in part, based on implicit feedback from a person. It is said to be implicit feedback because analysis of the dialogue or body language of the person is needed to determine a robot motion and the determination may not be clear. The robot motion script application 146 may further analyze sensor inputs, for example camera inputs, and generate the robot motion script 156 in part based on the analysis of the sensor inputs, for example based on analysis of camera inputs. For example, the robot motion script application 146 may generate the robot motion scripts 156 based at least in part on a body language of the person based on analysis of camera images of the person. This may also be referred to as generating the robot motion script 156 based, at least in part, on implicit feedback.

The robot motion script application 146 may store a log of both explicit feedback and implicit feedback associated with a person and use these in future generation of robot motion scripts 156. The social robot 140 is able to distinguish between different persons and adapt the robot dialogues 154 and/or robot motion scripts 156 to the social context associated with different persons. For example, a camera of the second robot 140 captures an image of the person, an application executing on the processor 142 performs facial recognition processing on the image, and the identity of the person is looked up in a memory of the second social robot 140.

The motion script application 146 may adapt the amplitude of robot motions or robot gestures based on the age of the person with whom the social robot 140 is interacting. For example, the robot 140 may enact its motions with greater amplitude when interacting with an older person than with a younger person, on the theory that the older person may not readily perceive more restrained motions. Alternatively, the robot 140 may enact its motions with lesser amplitude when interacting with an older person than with a younger person, on the theory that the older person may be more readily intimidated by less restrained motions.

Figure 3:
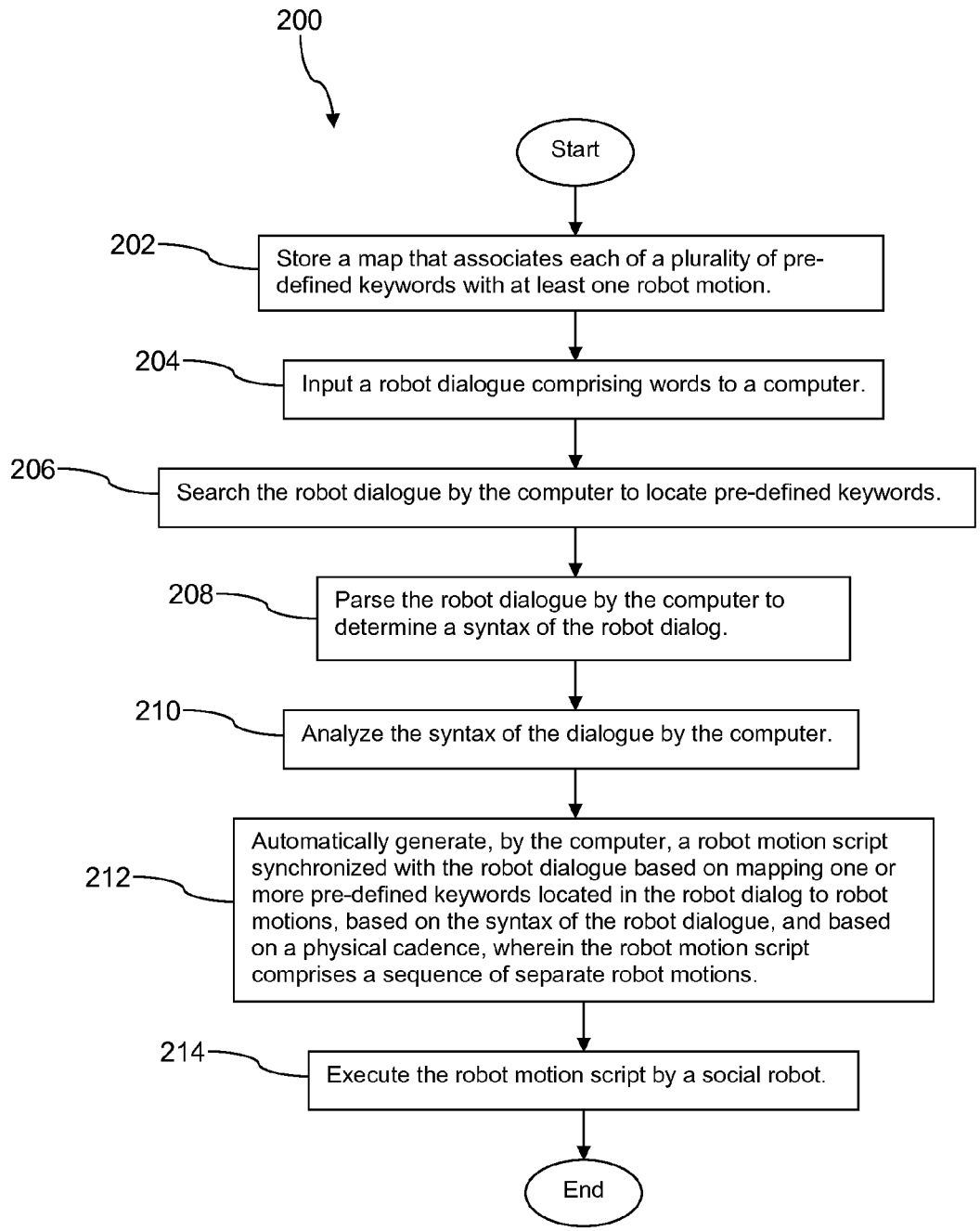
FIG. 3 is a flow chart of a method according to an embodiment of the disclosure.

Turning now to FIG. 3, a method 200 is described. At block 202, store a map that associates each of a plurality of pre-defined keywords with at least one robot motion. Some pre-defined keywords may be associated with a plurality of different robot motions. In an embodiment, each of the keyword to motion associations may be further associated with a numeric value indicating the preference of the association relative to other associations involving the same keyword. At block 204, input a robot dialogue comprising words to a computer. The input may further comprise indications of intonations, pauses, and rhythms. At block 206, search the robot dialogue by the computer to locate pre-defined keywords. At block 208, parse the robot dialogue by the computer to determine a syntax of the robot dialog. At block 210, analyze the syntax of the dialogue by the computer. At block 212, automatically generate, by the computer, a robot motion script synchronized with the robot dialogue based on mapping one or more pre-defined keywords located in the robot dialog to robot motions, based on the syntax of the robot dialogue, and based on a physical cadence, wherein the robot motion script comprises a sequence of separate robot motions. At block 214, execute the robot motion script by a social robot.

Figure 4:
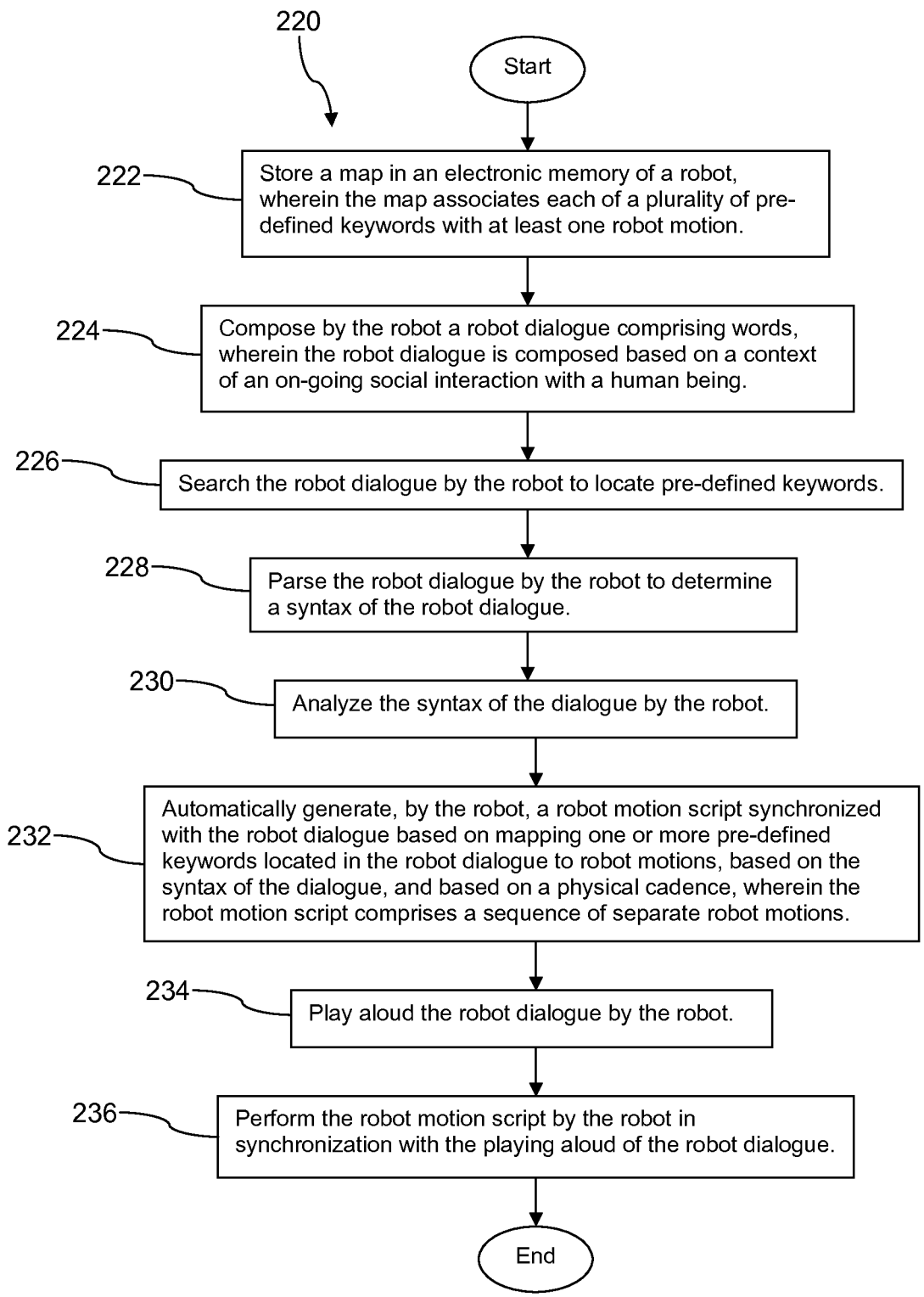
FIG. 4 is a flow chart of another method according to an embodiment of the disclosure.

Turning now to FIG. 4, a method 220 is described. At block 222, store a map in an electronic memory of a robot, wherein the map associates each of a plurality of pre-defined keywords with at least one robot motion. Some pre-defined keywords may be associated with a plurality of different robot motions. In an embodiment, each of the keyword to motion associations may be further associated with a numeric value indicating the preference of the association relative to other associations involving the same keyword. At block 224, compose by the robot a robot dialogue comprising words, wherein the robot dialogue is composed based on a context of an on-going social interaction with a human being. The robot dialog may further comprise indications of intonations, pauses, and rhythm to be used by the robot when playing back or reciting the robot dialogue. At block 226, search the robot dialogue by the robot to locate pre-defined keywords. At block 228, parse the robot dialogue by the robot to determine a syntax of the robot dialogue. At block 230, analyze the syntax of the dialogue by the robot. At block 232, automatically generate, by the robot, a robot motion script synchronized with the robot dialogue based on mapping one or more pre-defined keywords located in the robot dialogue to robot motions, based on the syntax of the dialogue, and based on a physical cadence, wherein the robot motion script comprises a sequence of separate robot motions. The robot motion script may further be generated based on feedback from a person with whom the robot is interacting, for example either explicit feedback and/or implicit feedback. The robot motion script may further be generated based on a log or historical record of previous robot motions, for example to randomize the frequency or period of enacting meaning-neutral motions or to provide natural variation among gestures or motions used by the robot. At block 234, play aloud the robot dialogue by the robot. At block 236, perform the robot motion script by the robot in synchronization with the playing aloud of the robot dialogue.

Figure 5:
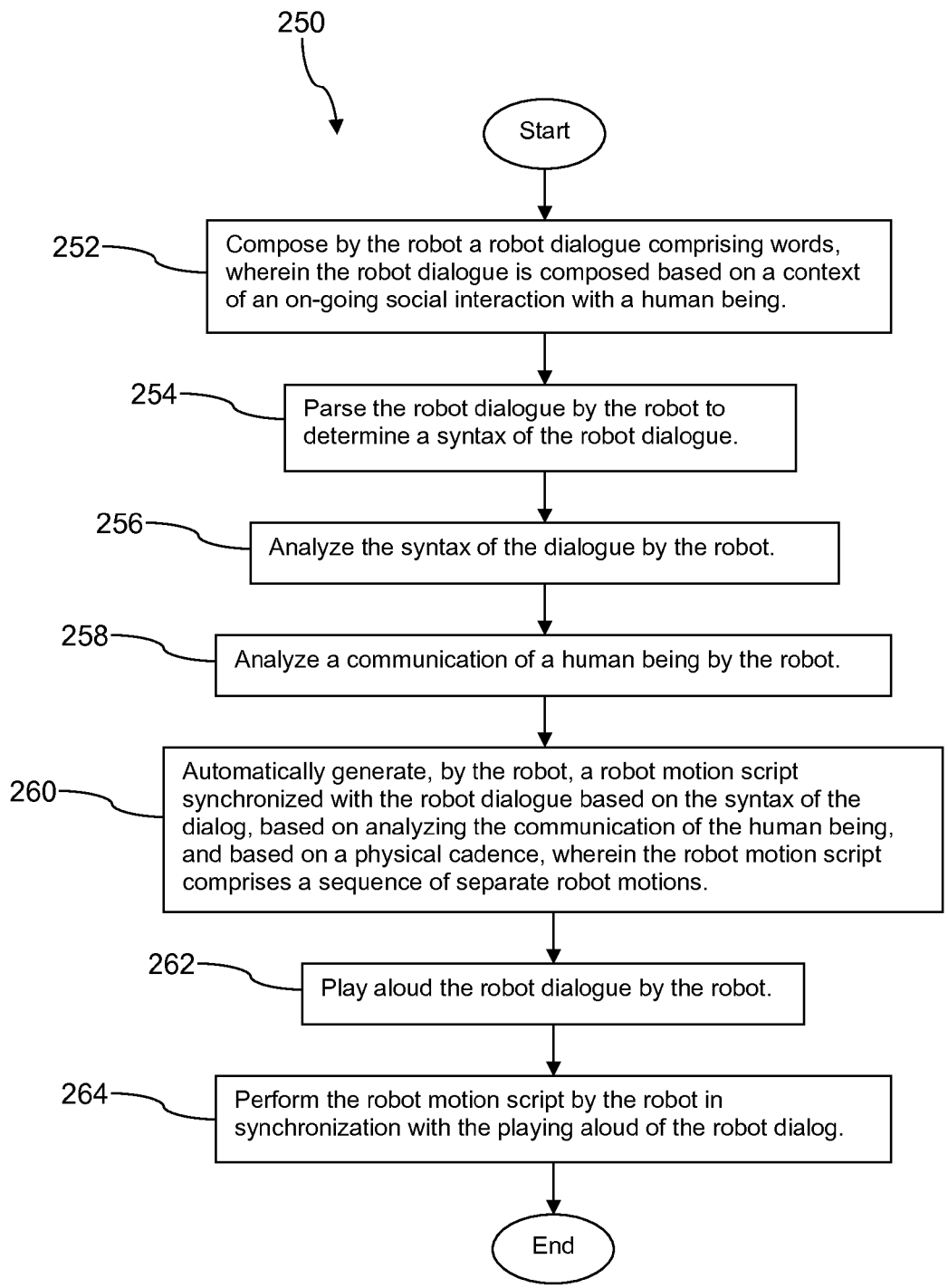
FIG. 5 is a flow chart of yet another method according to an embodiment of the disclosure.

Turning now to FIG. 5, a method 250 is described. At block 252, compose by the robot a robot dialogue comprising words, wherein the robot dialogue is composed based on a context of an on-going social interaction with a human being. At block 254, parse the robot dialogue by the robot to determine a syntax of the robot dialogue. At block 256, analyze the syntax of the dialogue by the robot. At block 258, analyze a communication of a human being by the robot. At block 260, automatically generate, by the robot, a robot motion script synchronized with the robot dialogue based on the syntax of the dialog, based on analyzing the communication of the human being, and based on a physical cadence, wherein the robot motion script comprises a sequence of separate robot motions. At block 262, play aloud the robot dialogue by the robot. At block 264 perform the robot motion script by the robot in synchronization with the playing aloud of the robot dialog.

Figure 6:
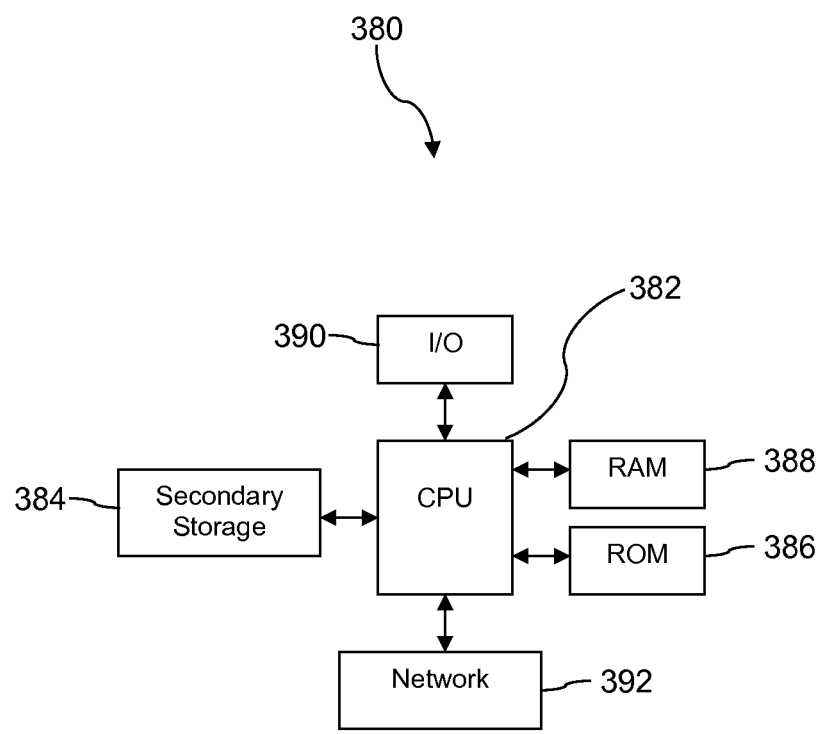
FIG. 6 is a block diagram of a computer system according to an embodiment of the disclosure.

FIG. 6 illustrates a computer system 380 suitable for implementing one or more embodiments disclosed herein. The computer 102 described above with reference to FIG. 1 may be implemented in a form similar to that of computer system 380. Some aspects of the social robot 120 correspond to the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of synchronizing robot motion with a social interaction, comprising:
    composing by the robot a robot dialogue comprising words, wherein the robot dialogue is composed based on a context of an on-going social interaction with a human being;
    parsing the robot dialogue by the robot to determine a syntax of the robot dialogue;
    analyzing the syntax of the dialogue by the robot;
    automatically generating, by the robot, a robot motion script synchronized with the robot dialogue based on the syntax of the dialogue and based on a physical cadence, wherein the robot motion script comprises a sequence of separate robot motions, and wherein generating the robot motion script based on the physical cadence comprises incorporating at least one of an eye blink robot motion, a weight shift robot motion, and a head nod robot motion into the robot motion script;
    playing aloud the robot dialogue by the robot; and
    performing the robot motion script by the robot in synchronization with the playing aloud of the robot dialogue.

2. The method of claim 1, further comprising analyzing a communication of a human being, wherein the robot motion script is further generated based on analyzing the communication of the human being.

3. The method of claim 2, wherein the communication of the human being is body language communication that is captured by a camera of the robot.

4. The method of claim 2, wherein the communication of the human being is a request spoken by the human being that is captured by a microphone of the robot and wherein analyzing the communication of the human being comprises processing the spoken request captured by the microphone by a voice recognition component.

5. The method of claim 1, further comprising:
    storing by the robot a log of eye blink robot motions, weight shift robot motions, and head nod robot motions performed by the robot; and
    analyzing by the robot the log of robot motions,
    wherein automatically generating the robot motion script based on the physical cadence comprises randomizing the eye blink robot motions, the weight shift robot motions, and head nod robot motions.

6. The method of claim 5, wherein randomizing the eye blink robot motions comprises varying a frequency of the eye blink robot motions randomly within a pre-defined range of frequency.

7. A method of synchronizing robot motion with a social interaction, comprising:
- composing by the robot a robot dialogue comprising words, wherein the robot dialogue is composed based on a context of an on-going social interaction with a human being;
- parsing the robot dialogue by the robot to determine a syntax of the robot dialogue;
- analyzing the syntax of the dialogue by the robot;
- analyzing a communication of the human being by the robot;
- automatically generating, by the robot, a robot motion script synchronized with the robot dialogue based on the syntax of the dialogue, based on analyzing the communication of the human being, and based on a physical cadence, wherein the robot motion script comprises a sequence of separate robot motions;
- playing aloud the robot dialogue by the robot; and
- performing the robot motion script by the robot in synchronization with the playing aloud of the robot dialogue.

8. The method of claim 7, wherein the communication of the human being is body language communication that is captured by a camera of the robot.

9. The method of claim 7, wherein the communication of the human being is a request spoken by the human being that is captured by a microphone of the robot.

10. The method of claim 9, wherein the request spoken by the human being is one of a request to speak louder, a request to speak more quietly, a request to move slower, or a request to move less.

11. The method of claim 10, wherein the robot automatically generates the robot motion script with reduced motion amplitude based on the request to speak more quietly.

12. The method of claim 10, wherein generating the robot motion script based on the physical cadence comprises incorporating at least one of an eye blink robot motion, a weight shift robot motion, and a head nod robot motion into the robot motion script, and wherein the robot automatically generates the robot motion script with less frequent head nod robot motion based on the request to speak more quietly.

13. The method of claim 1, further comprising:
- storing a map in an electronic memory of a robot, wherein the map associates each of a plurality of pre-defined keywords with at least one robot motion; and
- searching the robot dialogue by the robot to locate pre-defined keywords.

14. The method of claim 13, wherein the robot motion script is further generated based on mapping one or more pre-defined keywords located in the robot dialogue to robot motions.

15. The method of claim 5, wherein randomizing the head nod robot motions comprises varying an amplitude of the head not robot motions randomly within a pre-defined head nod amplitude range.

16. The method of claim 5, wherein randomizing the weight shift robot motions comprises varying a frequency of the weight shift robot motions randomly within a pre-defined weight shift frequency range.

17. The method of claim 1, wherein a head cant robot motion is occasionally generated in the robot script to synchronize with a question syntax of the robot dialogue.

18. The method of claim 1, wherein performing the robot motion script by the robot comprises modulating an amplitude of motions based on an age level of the human being with whom the robot is engaging in the on-going social interaction.

19. The method of claim 7, wherein a head cant robot motion is occasionally generated in the robot script to synchronize with a question syntax of the robot dialogue.

20. The method of claim 7, wherein performing the robot motion script by the robot comprises modulating an amplitude of motions based on an age level of the human being with whom the robot is engaging in the on-going social interaction.

* * * * *